United States Patent
Moriya et al.

(10) Patent No.: US 7,646,402 B2
(45) Date of Patent: Jan. 12, 2010

(54) ELECTRONIC CAMERA CAPABLE OF SETTING A PRINT NUMBER OF A TAKEN IMAGE

(75) Inventors: Mitsuhiro Moriya, Minami-Ashigara (JP); Hideaki Kataoka, Minami-Ashigara (JP); Akira Haishi, Minami-Ashigara (JP); Akihisa Iida, Minami-Ashigara (JP); Shu Hamada, Asaka (JP)

(73) Assignee: Fujifilm Corporation, Tokyo (JP)

( * ) Notice: Subject to any disclaimer, the term of this patent is extended or adjusted under 35 U.S.C. 154(b) by 658 days.

(21) Appl. No.: 11/089,324

(22) Filed: Mar. 25, 2005

(65) Prior Publication Data
US 2005/0226596 A1 Oct. 13, 2005

(30) Foreign Application Priority Data
Mar. 26, 2004 (JP) ............................. 2004-093277

(51) Int. Cl.
*H04N 5/225* (2006.01)
*H04N 5/222* (2006.01)
(52) U.S. Cl. .............................. 348/207.2; 348/333.01; 348/330.02
(58) Field of Classification Search ................. 348/207, 348/207.2, 333.01, 333.02, 333.12, 231.3; 347/2
See application file for complete search history.

(56) References Cited

U.S. PATENT DOCUMENTS

| | | | | |
|---|---|---|---|---|
| 5,809,353 | A * | 9/1998 | Hirano | 396/55 |
| 6,122,003 | A * | 9/2000 | Anderson | 348/333.01 |
| 6,563,542 | B1 * | 5/2003 | Hatakenaka et al. | 348/207.2 |
| 6,724,502 | B1 * | 4/2004 | Miyake et al. | 348/207.2 |
| 7,053,931 | B2 * | 5/2006 | Nishi et al. | 348/207.2 |
| 2003/0001957 | A1 * | 1/2003 | Kubota | 348/207.2 |
| 2003/0122935 | A1 * | 7/2003 | Shiohara | 348/207.2 |
| 2003/0151668 | A1 * | 8/2003 | Hatakenaka et al. | 348/207.2 |
| 2004/0028399 | A1 * | 2/2004 | Moriya et al. | 396/6 |
| 2004/0041913 | A1 * | 3/2004 | Takasumi et al. | 348/207.2 |
| 2004/0051784 | A1 * | 3/2004 | Ejima et al. | 348/207.99 |
| 2007/0013781 | A1 * | 1/2007 | Kageyama et al. | 348/207.2 |

* cited by examiner

*Primary Examiner*—Nhan T Tran
(74) *Attorney, Agent, or Firm*—Young & Thompson

(57) ABSTRACT

Shooting is performed upon full depression of a shutter button, and a taken image is recorded in a memory card as an image file. An LCD displays the taken image and a print number thereof. The print number is adjusted by pressing addition and subtraction buttons. Upon pressing a decision button, number data of the print number is inputted. The number data is recorded in the memory card so as to relate to the image file. Incidentally, in case the shutter button is pressed by half without inputting the number data, the print number is set to one, and next shooting is allowed. The above operation is repeated until entire shooting is completed.

8 Claims, 3 Drawing Sheets

ELECTRONIC CAMERA CAPABLE OF SETTING A PRINT NUMBER OF A TAKEN IMAGE

BACKGROUND OF THE INVENTION

1. Field of the Invention

The present invention relates to an electronic camera capable of setting a print number of a taken image.

2. Description of the Related Art

Electronic cameras are in widespread use. In such electronic cameras, a shooting image taken by a CCD image sensor and so forth is converted into digital image data and is recorded in a recording medium of an embedded memory, a memory card and so forth. The image taken by the electronic camera is not only viewed on a liquid-crystal display, which is provided on a camera body, but also is often printed by a home-use printer or by a street laboratory.

In the meantime, nowadays it is known that there is an electronic camera in which print-number data of the taken image is recorded in the recording medium besides the image data of the taken image. When the recording medium in which the print-number data is recorded is set to a predetermined printer, a selected image frame is automatically printed by a designated number. Thus, by inputting the print-number data beforehand into the recording medium, it is unnecessary to set the print number during a printing operation. This is very useful.

An operation for inputting the print-number data into the recording medium is often performed after taking a plurality of images. In some electronic cameras, it is possible to input the print-number data by pressing a predetermined button. Concretely, the electronic camera is set to a print designation mode after taking images, and under this mode, a picture for setting the print number is selected with right-and-left buttons of a cross-shaped button. And then, the print number is increased and decreased with up-and-down buttons of the cross-shaped button.

However, the operation for inputting the print-number data into the recording medium is troublesome for an operator being unused to handling of the electronic camera. In particular, as to the electronic camera having various functions, workings of the buttons change in accordance with the respective modes so that it is difficult to select the proper button. The operation for inputting the print-number data is complicated.

SUMMARY OF THE INVENTION

In view of the foregoing, it is a primary object of the present invention to provide an electronic camera in which an operation for setting a print number of a taken image is easy.

In order to achieve the above and other objects, the electronic camera according to the present invention comprises a number setting portion, a first mode changer and a second changer. The electronic camera has a shoot mode for taking an image, and a print-number setting mode for setting a print number of the taken image. The number setting portion is operable under the print-number setting mode to perform setting of the print number. The first mode changer changes the shoot mode to the print-number setting mode whenever shooting is performed. The second mode changer changes the print-number setting mode to the shoot mode upon operation of the number setting portion.

It is preferable that the electronic camera comprises an image deleting portion and a third mode changer. The image deleting portion is operable under the print-number setting mode to delete image data of the taken image. The third mode changer changes the print-number setting mode to the shoot mode when the image deleting portion has been operated under the print-number setting mode without operating the number setting portion.

Further, it is preferable that the electronic camera comprises a shutter button and a fourth mode changer. The shutter button is fully depressed or is depressed by half. The fourth mode changer changes the print-number setting mode to the shoot mode when the shutter button has been depressed by half under the print-number setting mode without operating the number setting portion and the image deleting portion.

According to the present invention, it is possible to set the print number of the taken image whenever the image is taken. Since an operation for selecting any image from among the plural images is avoided, setting the print number of the taken image is easily conducted.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
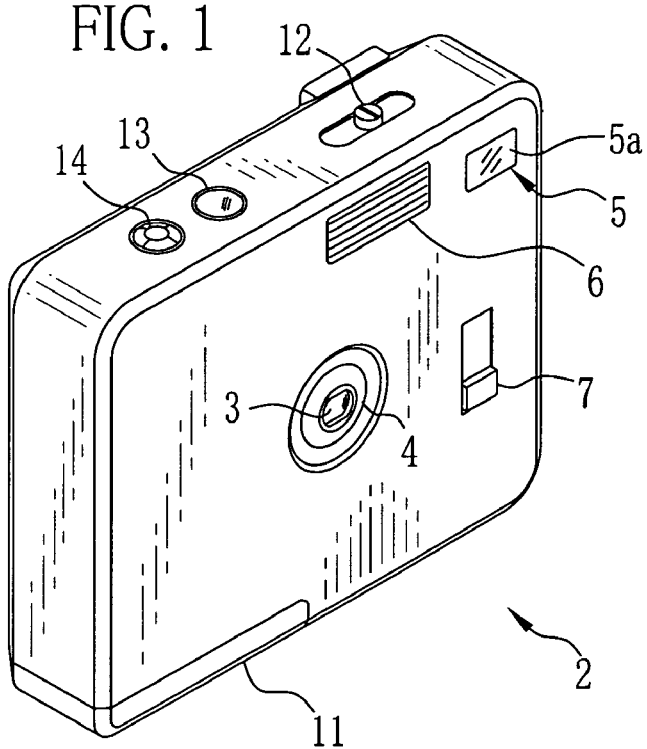
FIG. 1 is a front perspective view of an electronic camera.

As shown in FIG. 1, a front side of an electronic camera 2 is provided with a lens barrel 4 containing a taking lens 3, a front viewfinder window 5a of a viewfinder 5, and a flash unit 6, and a flash-operating member 7. When the electronic camera 2 is in a power-off state, the lens barrel 4 is retracted in a barrel container provided at the front of the electronic camera 2. When the electronic camera 2 is in a power-on state, the lens barrel 4 protrudes from the front thereof. The flash-operating member 7 is vertically slidable. When this member 7 is slid to an upper on-position, flash charging is performed and flash emission is allowed. Upon sliding the flash-operating member 7 downward from the on-position to an off-position, the flash charging is halted and the flash emission is prohibited.

A lower portion of the electronic camera 2 is provided with a battery chamber to which a battery (not shown) of the electronic camera is set. The bottom of the electronic camera 2 is provided with a lid 11 to open and close an opening to be used for accessing the battery chamber.

Figure 2:
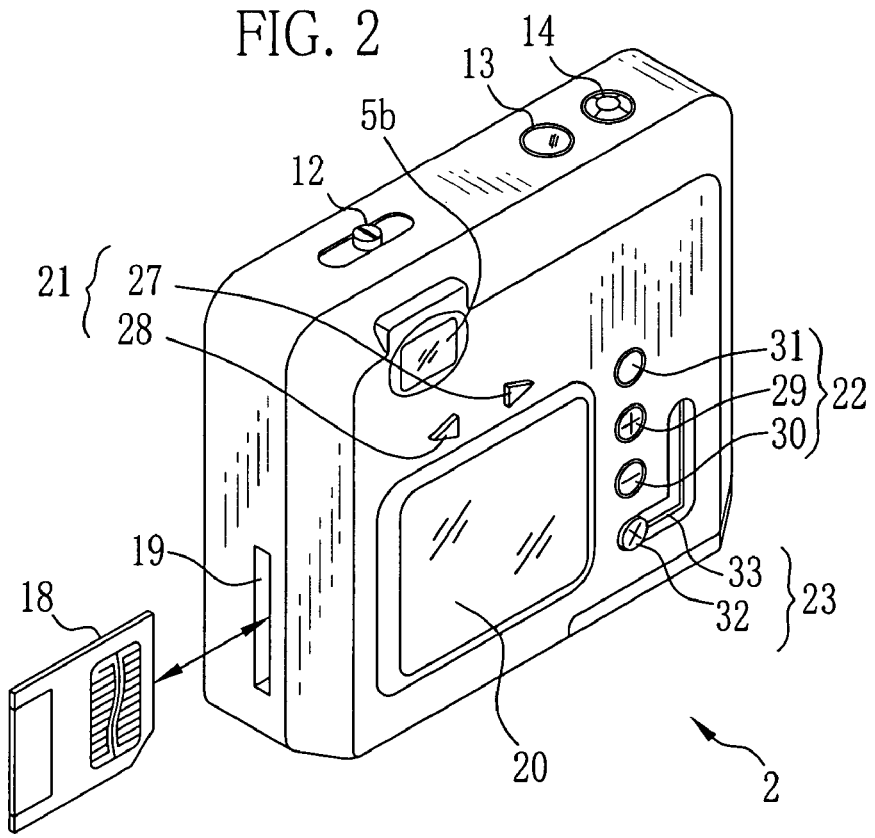
FIG. 2 is a rear perspective view of the electronic camera.

As shown in FIG. 2, the top of the electronic camera 2 is provides with a main switch 12, a remaining number indicator 13 and a shutter button 14. By horizontally sliding the main switch 12, it is possible to set the electronic camera 2 in three statuses of the power-off state, an imaging mode and a reproducing mode. When the imaging mode or the reproducing mode is set, the power is turned on. The remaining number indicator 13 always indicates a remaining number of images to be taken, regardless of power on and power off. The shutter button 14 is a two-step switch. Upon lightly depressing the shutter button 14 (half depression), various processes for shooting preparation are performed. For instance, exposure control and focus adjustment are conducted. Upon strongly depressing the shutter button 14 (full depression), shooting is performed.

One lateral side of the electronic camera 2 is provided with a memory-card slot 19 to which a memory card 18 is detachably set. Behind the memory-card slot 19, a card reader to be electrically connected to the memory card 18 is incorporated to read and write data. The memory card 18 stores the image, which is taken by the electronic camera 2, as an image file.

The rear of the electronic camera 2 is provided with a rear viewfinder window 5b of the viewfinder 5, an LCD 20, an image changing portion 21, a number setting portion 22 and an image deleting portion 23. The LCD 20 displays a through image under the imaging mode and displays the image, which is recorded in the memory card 18, under the reproducing mode. In addition to the image, the LCD 20 displays a numeral for indicating a print number to be confirmed at the time of image printing. It is possible to determine the print number every image. The image changing portion 21 includes a forward button 27 and a backward button 28. The image changing portion 21 is operable under the reproducing mode. Whenever the forward button 27 or the backward button 28 is pressed under the reproducing mode, the image displayed on the LCD 20 is changed.

The number setting portion 22 includes an addition button 29, a subtraction button 30 and a decision button 31. The number setting portion 22 is operable after shooting or under the reproducing mode. Whenever the addition button 29 is pressed in a state that the LCD 20 displays the image and the numeral indicating the print number, the numeral displayed on the LCD 20 increases by one. In contrast, whenever the subtraction button 30 is pressed in this state, the numeral displayed on the LCD 20 decreases by one. After adjusting the numeral on the LCD 20 with the addition button 29 and the subtraction button 30, the decision button 31 is pressed and the print number is set to the current numeral.

Under the imaging mode, the number setting portion 22 is operable just after shooting and until decision of the print number. Hereinafter, this state is called as "print-number setting state" (print-number setting mode). Meanwhile, the number setting portion 22 is inoperable under the imaging mode after decision of the print number and before shooting. Hereinafter, this state is called as "capture waiting state" (shoot mode). Incidentally, the number setting portion 22 is always operable under the reproducing mode.

Figure 3:
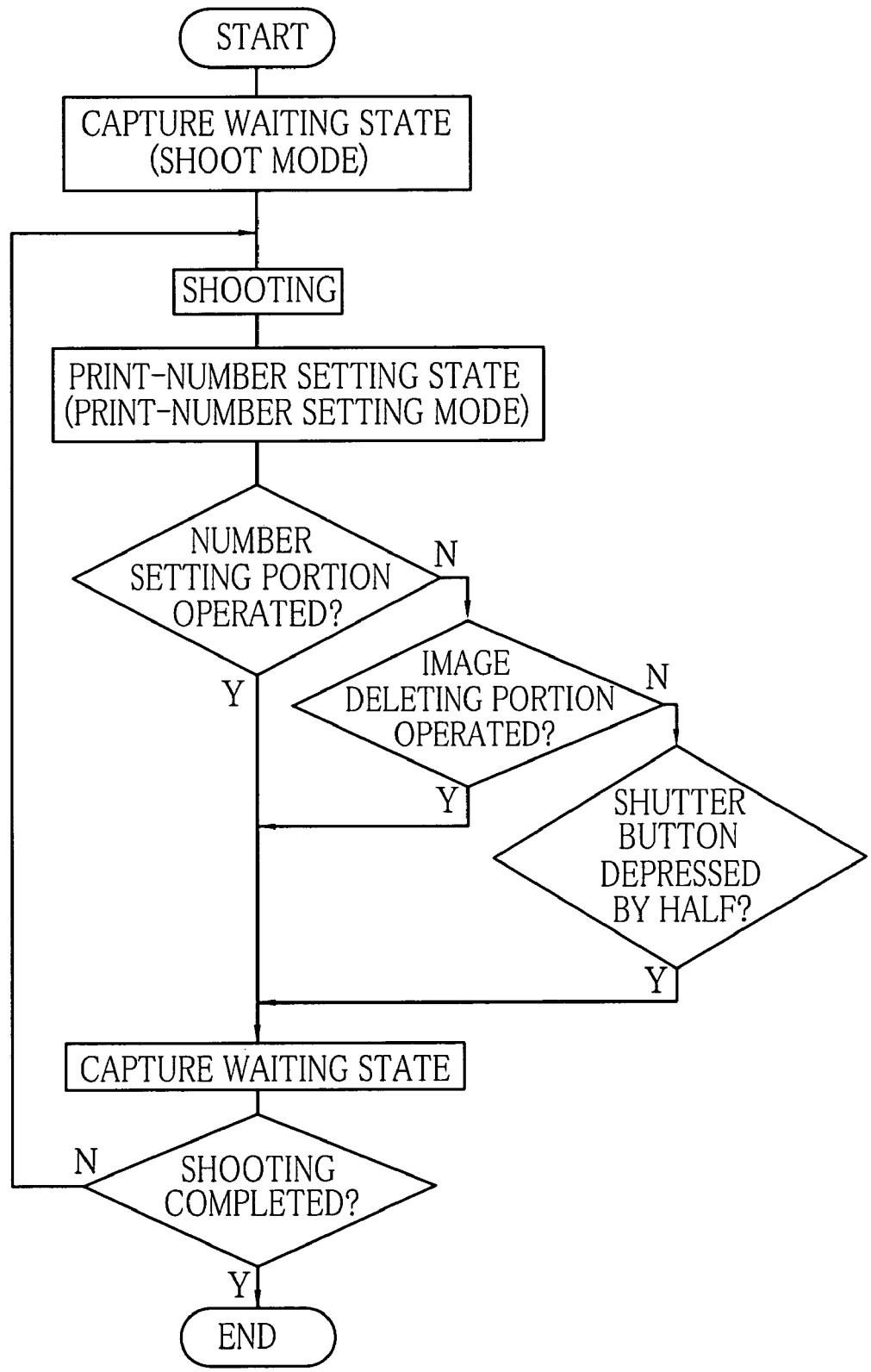
FIG. 3 is a flowchart showing an operation of the electronic camera.

In turn, whenever shooting is performed, the "capture waiting state" is changed to the "print-number setting state" (first changeover). Then, when the print number has been inputted by handling the number setting portion 22, the "print-number setting state" is changed to the "capture waiting state" (second changeover). FIG. 3 is a flowchart showing the changeover of the states to be caused by the shooting operation and by handling the number setting portion 22.

The image deleting portion 23 has an actuating member 32, which is movable between a leftmost off-position and an uppermost on-position. When the actuating member 32 is moved from the off-position to the on-position, the actuating member 32 is slid rightward along a groove 33, and then, is slid upward along the groove 33. Upon moving the actuating member 32 from the off-position to the on-position, the image file of the image displayed on the LCD 20 is deleted from the memory card 18. Since the actuating member 32 is moved from the off-position to the on-position in two steps, it is possible to prevent a wrong operation.

Similarly to the number setting portion 22, the image deleting portion 23 is operable in the "print-number setting state". Upon operating the image deleting portion 23 without operating the number setting portion 22, the "print-number setting state" is changed to the "capture waiting state" (third changeover).

In the meantime, when the shutter button 14 has been depressed halfway in the "print-number setting state" without operating the number setting portion 22 and the image deleting portion 23, the "print-number setting state" is changed to the "capture waiting state" (fourth changeover). The first to fourth changeovers are conducted by a control program incorporated in a system controller 37 described later.

Figure 4:
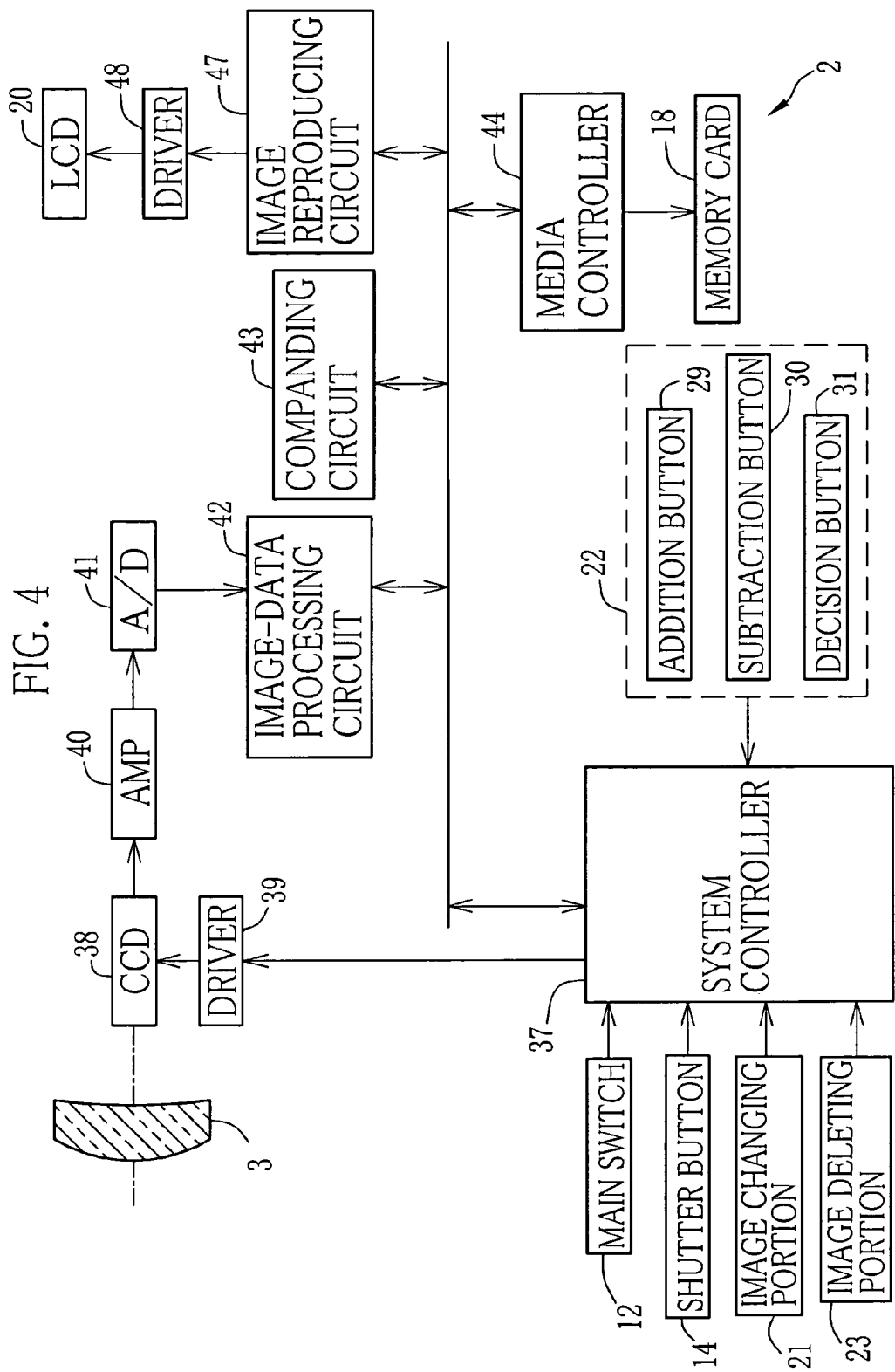
FIG. 4 is a block diagram showing an electrical structure of the electronic camera.

An electrical structure of the electronic camera 2 is described below with FIG. 4. Upon operation of the main switch 12, the shutter button 14, the image changing portion 21, the number setting portion 22 and the image deleting portion 23, information thereof is sent to the system controller 37 as a signal. The system controller 37 is constituted of a microcomputer including a CPU to integrally control the entire operation of the electronic camera 2.

Behind the taking lens 3, a CCD image sensor 38 is disposed. The CCD image sensor 38 is driven by a CCD driver 39 to convert an optical subject image into an electrical imaging signal. This imaging signal is outputted and is amplified up to a proper level in an amplifier 40. After that, an A-D converter 41 digitally converts the imaging signal into image data. An image-data processing circuit 42 performs processes of contour correction, gamma correction, white clip and so forth for the image data.

A companding circuit 43 compresses the image data to produce an image file, which is written in the memory card 18 by a media controller 44. An image reproducing circuit 47 performs a reproducing process for the image data, which has been outputted from the image-data processing circuit 42. Further, the image reproducing circuit 47 performs the reproducing process for the image file, which has been read from the memory card 18. The image data for which the reproducing process has been performed is displayed on the LCD 20 via an LCD driver 48.

When the shutter button 14 has been fully depressed, the imaging signal of one frame is converted into the image data. Successively, various processes are performed for the image data to produce the image file, and this image file is written in the memory card 18. At this time, a unique file name (a serial number in a shooting order, for instance DSCF0001) is given to the image file. The file name may be displayed on the LCD 20 together with the image.

By operating the image changing portion 21, it is possible to select any image file from among the image files recorded in the memory card 18. When the shutter button 14 has been fully depressed, the image file of the image taken at that time is selected. Upon operation of the number setting portion 22, number data of the determined print number is written in the memory card 18 so as to relate to the selected image file. Upon operation of the image deleting portion 23, the selected image file is deleted from the memory card 18.

Working of the above structure is described below. When the electronic camera 2 is set to the imaging mode, the LCD 20 displays the through image. Upon full depression of the shutter button 14, shooting is performed and the image data of the taken image is recorded in the memory card 18. The LCD 20 displays the taken image and the numeral indicating the print number. At this time, the print number is in the initial state and represents one. After shooting, the number setting portion 22 is operated to determine the print number. The number data of the determined print number is recorded in the memory card 18 so as to relate to the image data. By the way, in case the image deleting portion 23 is operated, the lastly taken image is deleted. In this case, it is unnecessary to determine the print number. After determining the print number, the LCD 20 displays the through image and the capture waiting state is set again. And then, the above operation is repeated. Incidentally, when the shutter button 14 has been depressed by half without operating the number setting portion 22, the print number is automatically determined as one. Also in this case, the LCD displays the through image and the capture waiting state is set again.

As described above, by determining the print number of the image just after shooting, it is possible to avoid the operation for selecting any image from among the plural images. Thus, the operation for determining the print number is more simplified. Meanwhile, the respective buttons constituting the number setting portion 22 and the image deleting portion 23 are exclusively provided so that the functions thereof are unchangeable. Thus, it is possible to prevent an operator from being confused.

When the electronic camera 2 is set to the reproducing mode, the LCD 20 displays the image recorded in the memory card 18. The displayed image is changeable by the image changing portion 21. By operating the number setting portion 22 and the image deleting portion 23 in the state that the LCD 20 displays any of the images, it is possible to perform resetting.

When a predetermined period has passed in a state that the power of the electronic camera 2 is turned on, the LCD 20 is switched to an undisplayed state for the purpose of saving the power. In this case, it is preferable that the LCD 20 is immediately returned by operating any of the portions. In particular, when the electronic camera 2 is set to the imaging mode, it is preferable that the LCD 20 is returned by half depression of the shutter button 14. Further, when the electronic camera 2 is set to the reproducing mode, it is preferable that the LCD 20 is returned by operating the image changing portion 21.

After finishing the entire shooting, the memory card 18 is placed in a predetermined printer. By doing so, the designated image frame is automatically printed by the determined number on the basis of the recorded image file and the recorded number data. The electronic camera 2 may be used as a single-use camera on condition that the camera has a simple structure and is manufactured at a reasonably low cost.

In the above embodiment, the remaining number indicator 13 is used. Instead of this indicator, the remaining number of the images to be taken may be displayed on the LCD 20. In this case, it is preferable that the remaining number is displayed on the LCD 20 in both modes of the imaging mode and the reproducing mode.

In the above embodiment, the image deleting portion 23 is constituted of the actuating member 32, which is slidable along the groove 33 in two ways. This structure, however, is not exclusive on condition that the operation thereof becomes effective after two or more steps. For instance, a cover may be provided over an operation button. In this case, two steps of opening the cover and pressing the operation button are necessary. Alternatively, a switch slidable in a pressed state may be provided. In this case, two steps of pressing the switch and sliding the switch are necessary.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electronic camera having a shoot mode for taking an image, and a print-number setting mode for setting a print number of the taken image, said electronic camera comprising:
    a number setting portion being operable under said print-number setting mode to perform setting of said print number;
    a first mode changer for automatically changing said shoot mode to said print-number setting mode whenever shooting is performed;
    a second mode changer for automatically changing said print-number setting mode to said shoot mode upon an operation of said number setting portion;
    a shutter button to be pressed in a full-depression state and a half-depression state; and
    a third mode changer for changing said print-number setting mode to said shoot mode when said shutter button has been pressed by half under said print-number setting mode without operating said number setting portion.

2. An electronic camera according to claim 1, further comprising:
    an image deleting portion being operable under said print-number setting mode to delete image data of the taken image; and
    a fourth mode changer for changing said print-number setting mode to said shoot mode when said image deleting portion has been operated under said print-number setting mode without operating said number setting portion.

3. An electronic camera according to claim 2, further comprising:
    a shutter button to be pressed in a full-depression state and a half-depression state;
    a fifth mode changer for changing said print-number setting mode to said shoot mode when said shutter button has been pressed by half under said print-number setting mode without operating said number setting portion and said image deleting portion.

4. An electronic camera according to claim 3, wherein said number setting portion comprises an addition button for increasing said print number, a subtraction button for decreasing said print number, and a decision button for determining said print number.

5. An electronic camera according to claim 4, wherein said image deleting portion includes a slidable actuating member, and said image data is deleted by moving said actuating member in two directions of a horizontal direction and a vertical direction.

6. An electronic camera according to claim 5, wherein said actuating member is moved along a groove formed in the horizontal direction and the vertical direction.

7. An electronic camera according to claim 6, further including:
    a detachable memory card in which the taken image and the print number are stored so as to relate to each other.

8. The electronic camera according to claim 1, wherein the number setting portion stores the print-number in association with an image on a storage media, the print-number indicating a printing of an image upon the insertion of the storage media in a printer.

* * * * *

UNITED STATES PATENT AND TRADEMARK OFFICE
CERTIFICATE OF CORRECTION

PATENT NO. : 7,646,402 B2  Page 1 of 1
APPLICATION NO. : 11/089324
DATED : January 12, 2010
INVENTOR(S) : Moriya et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1175 days.

Signed and Sealed this

Twenty-eighth Day of December, 2010

David J. Kappos
*Director of the United States Patent and Trademark Office*